United States Patent
Millard

(10) Patent No.: US 11,650,591 B1
(45) Date of Patent: *May 16, 2023

(54) TRAJECTORY PLANNING FOR MOBILE ROBOTS

(71) Applicant: X Development LLC, Mountain View, CA (US)

(72) Inventor: David Millard, Los Angeles, CA (US)

(73) Assignee: X Development LLC, Mountain View, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/325,670

(22) Filed: May 20, 2021

Related U.S. Application Data

(63) Continuation of application No. 15/881,271, filed on Jan. 26, 2018, now Pat. No. 11,016,491.

(51) Int. Cl.
| | |
|---|---|
| G05B 19/04 | (2006.01) |
| G05B 19/18 | (2006.01) |
| G05D 1/02 | (2020.01) |
| G06N 3/08 | (2023.01) |

(52) U.S. Cl.
CPC .......... *G05D 1/0214* (2013.01); *G06N 3/08* (2013.01); *G05B 2219/39208* (2013.01); *G05D 1/0231* (2013.01); *G05D 1/0255* (2013.01); *G05D 1/0257* (2013.01)

(58) Field of Classification Search
CPC .. G05D 1/0214; G05D 1/0231; G05D 1/0255; G05D 1/0257; G06N 3/08; G05B 2219/39208

See application file for complete search history.

(56) References Cited

U.S. PATENT DOCUMENTS

| | | |
|---|---|---|
| 7,211,980 B1 | 5/2007 | Bruemmer et al. |
| 8,214,079 B2 | 7/2012 | Lee et al. |
| 8,396,254 B1 | 3/2013 | Hickman |
| 8,432,443 B2 | 4/2013 | Nam et al. |
| 9,129,148 B1 | 9/2015 | Li et al. |
| 9,574,883 B2 | 2/2017 | Watts et al. |
| 9,751,212 B1 | 9/2017 | Martinson et al. |

(Continued)

OTHER PUBLICATIONS

Althaus et al., "Behavior coordination in structured environments," Advanced Robotics, Jan. 2003, 17(7):19 pages.

(Continued)

*Primary Examiner* — Harry Y Oh
*Assistant Examiner* — Sohana Tanju Khayer
(74) *Attorney, Agent, or Firm* — McDonnell Boehnen Hulbert & Berghoff LLP

(57) ABSTRACT

This specification describes trajectory planning for robotic devices. A robotic navigation system can obtain, for each of multiple time steps, data representing an environment of a robot at the time step. The system generates a series of occupancy maps for the multiple time steps, and uses the series of occupancy maps to determine occupancy predictions for one or more future time steps. Each occupancy prediction can identify predicted locations of obstacles in the environment of the robot at a different one of the future time steps. A planned trajectory can be determined for the robot using the occupancy predictions, and the robot initiates travel along the planned trajectory.

19 Claims, 6 Drawing Sheets

(56) References Cited

U.S. PATENT DOCUMENTS

| | | | |
|---|---|---|---|
| 2015/0154328 A1* | 6/2015 | Michalke | G06F 30/20 |
| | | | 703/1 |
| 2017/0249504 A1 | 8/2017 | Martinson et al. | |
| 2018/0364731 A1* | 12/2018 | Liu | G06V 10/40 |
| 2019/0080604 A1 | 3/2019 | Yogannan | |
| 2019/0113927 A1* | 4/2019 | England | G05D 1/0221 |
| 2019/0213438 A1* | 7/2019 | Jones | G06V 30/194 |
| 2019/0332121 A1* | 10/2019 | Kim | A47L 9/009 |
| 2020/0159227 A1 | 5/2020 | Cohen | |

OTHER PUBLICATIONS

Anati, "Semantic Localization and Mapping in Robot Vision," University of Pennsylvania, Scholarly Commons, Publicly Accessible Penn Dissertations, Jan. 1, 2016, 1587:172.

Buschka et al., "A Virtual Sensor for Room Detection," IEEE/RSJ International Conference on Intelligent Robots and Systems, 2002, 1:6 pages.

Choi et al., "Automated Space Classification for Network Robots in Ubiquitous Environments," Journal of Sensors, 2015, 2015(954920):9 pages.

Cosgun et al., "Context Aware Robot Navigation using Interactively Build Semantic Maps," arXiv 1710.08682v1, Oct. 24, 2017, 19 pages.

Espinace et al., "Indoor scene recognition by a mobile robot through adaptive object detection," Robotics and Autonomous Systems, Sep. 30, 2013, 61(9):16 pages.

Garcia-Garcia et al., "A review on deep learning techniques applied to semantic segmentation," arXiv 1704.06857v1, Apr. 22, 2017, 23 pages.

Guo et al., "3D mesh labeling via deep convolutional neural networks," ACM Transactions on Graphics, Dec. 29, 2015, 35(1):12 pages.

Kim et al., "Probabilistic Vehicle Trajectory Prediction over Occupancy Grid Map via Recurrent Neural Network," 2017 IEEE 20th International Conference on Intelligent Transportation Systems, Oct. 2017, 6 pages.

Koenig et al., "Xavier: A robot navigation architecture based on partially observable markov decision process models," Artificial Intelligence Based Mobile Robotics: Case Studies of Successful Robot Systems, May 1, 1998, 24 pages.

Kuipers et al., "Bootstrap Learning for Place Recognition," Proceedings of the 18th National Conference on Artificial Intelligence, Jul. 2002, 7 pages.

Maturama et al., "VoxNet: a 3D convolutional neural network for real-time object recognition," IEEE/RSJ International Conference on Intelligent Robots and Systems, Sep. 28, 2015, 7 pages.

McCormac et al., "SemanticFusion: Dense 3D Semantic Mapping with Convolutional Neural Networks," arXiv 1609.05130, Sep. 16, 2016, 8 pages.

Mozos, "Semantic Labeling of Places with Mobile Robots," Heidelberg: Springer, Feb. 4, 2010, 61:176 pages.

Paszke, et al., "ENet: a deep neural network architecture for real-time semantic segmentation," Under review as a conference paper at ICLR, arXiv preprint arXiv 1606.02147, Jun. 2017, 10 pages.

Pronobis et al., "A realistic benchmark for visual indoor place recognition," Robotics and Autonomous Systems, Jan. 31, 2010, 58(1):17 pages.

Pronobis et al., "Multi-modal Semantic Place Classification," The International Journal of Robotics Research, Feb. 2010, 29(2-3):24 pages.

Qi et al., "PointNet: Deep learning on point sets for 3D classification and segmentation," Conference on Computer Vision and Pattern Recognition, 2017, 4 pages.

Ribes et al., "Object-based Place Recognition for Mobile Robots Using Panoramas," Proceedings of the 11th International Conference of the Catalan Association for Artificial Intelligence, Oct. 15, 2008, 184:8 pages.

Rottmann et al., "Semantic Place Classification of Indoor Environments with Mobile Robots using Boosting," AAAI, Jul. 9, 2005, 5:6 pages.

Rusu et al., "Model-based and learned semantic object labeling in 3d point cloud maps of kitchen environments," IEEE/RSJ International Conference on Intelligent Robots and Systems, Oct. 10, 2009, 8 pages.

Sisbot et al., "A Human Aware Mobile Robot Motion Planner," IEEE Transaction on Robotics, Oct. 2007, 23(5):10 pages.

stanford.edu [online], "PointNet: Deep learning on point sets for 3D classification and segmentation," 2017, retrieved on Dec. 19, 2017, retrieved from URL<http://stanford.edu/~rqi/pointnet/docs/cvpr17_pointnet_slides.pdf> 68 slides.

Thrun et al., "A Probabilistic Approach to Concurrent Mapping and Localization for Mobile Robots," Machine Learning and Autonomous Robots, Jul. 1998, 31(5):25 pages.

Torralba et al., "Context-based Vision system for place and object recognition," IEEE, Null., Oct. 13, 2003, 8 pages.

Vasudevan et al., "Cognitive Maps for Mobile Robots," Robotics and Autonomous Systems, Jan. 2007, 55:13 pages.

Wang et al., "Scene classification with deep convolutional neural networks," University of California, 7 pages.

wikipedia.org [online] "Occupancy grid mapping," Last updated Nov. 2, 2016, retrieved on Jan. 25, 2018, retrieved from URL<https://en.wikipedia.org/wiki/Occupancy_grid_mapping> 3 pages.

www.cs.cmu.edu [online], "Lecture #06: Occupancy Maps," Oct. 10, 2015, retrieved on Jan. 25, 2018, retrieved from URL http://www.cs.cmu.edu/~16831-f14/notes/F14/16831_lecture06_agiri_dmcconac_kumarsha_nbhakta.pdf via the Wayback Internet Archive from Internet: URL<https://web.archive.org/web/20151115000000*/http://www.cs.cmu.edu/~16831-f14/notes/F14/16831_lecture06_agiri_dmcconac_kumarsha_nbhakta.pdf> 5 pages.

www.qualcomm.com [online], "Finding Objects in Cluttered Scenes for Home Robotics," Jim Little, Presentation in Laboratory for Computational Intelligence Computer Science, UBC Vancouver, retrieved on Dec. 19, 2017, Retrieved from Internet: URL<https://www.qualcomm.com/media/.../augmented-reality-lecture-series-jim-little.pdf> 91 slides.

Yu et al., "CASENet: deep category-aware semantic edge detection," arXiv 1705.09759v1, May 27, 2017, 16 pages.

\* cited by examiner

TRAJECTORY PLANNING FOR MOBILE ROBOTS

BACKGROUND

This patent application is a continuation (and claims the benefit of priority under 35 USC § 120) of U.S. patent application Ser. No. 15/881,271, filed Jan. 26, 2018. The disclosure of the prior application is considered part of (and is incorporated by reference in) the disclosure of this application.

BACKGROUND

This specification generally relates to autonomous navigation, such as for mobile robotic devices.

Robots have facilitated automation of tasks in various settings from factories to offices, homes, and other environments. Some robots are autonomous, and are capable of performing tasks with little or no human supervision. Some robots are both mobile and autonomous, and are capable of navigating in an environment autonomously. For example, a mobile autonomous robot may travel in designated areas of an environment to clean, pick up and re-arrange items, or perform other specified tasks. Robots may also include sensors that allow it to sense information about its environment, which can then be processed to map the environment and locate the robot therein.

SUMMARY

This specification discloses systems, methods, devices, and other techniques for facilitating navigation of an autonomous device, such as a robot. An important task of autonomous devices is to avoid obstacles as the device moves around an environment, and to minimize risks of collision. The techniques disclosed herein are aimed at planning paths for an autonomous robot that allow the robot to travel to a goal location while maneuvering around obstacles, thereby avoiding collisions and respecting social considerations that, for example, may impose wider boundaries around objects than are required by their physical presence. In some implementations, the autonomous navigational system includes a predictive model that is operable to predict locations of dynamic obstacles that move in an environment concurrently with the robot's travel in the environment. By predicting the locations of moving objects, the system can plan a path for the robot that accounts for these movements and minimizes the likelihood of the robot's travel interfering with the movement of the other objects in the environment.

Some implementations of the subject matter described herein include a computer-implemented method. The method can include obtaining, for each of multiple time steps, data representing an environment of a robot at the time step. A series of occupancy maps can be generated for the multiple time steps, each occupancy map identifying locations of obstacles in the environment of the robot at a different one of the multiple time steps. Using the series of occupancy maps, occupancy predictions can be generated for one or more future time steps that follow the multiple time steps, each occupancy prediction identifying predicted locations of obstacles in the environment of the robot at a different one of the future time steps. A planned trajectory can be determined for the robot using the occupancy predictions, and the robot can initiate travel of the robot along the planned trajectory.

These and other implementations can optionally include one or more of the following features.

For each of the multiple time steps, the data representing the environment of the robot at the time step can be a three-dimensional (3D) representation of the environment based on measurements by one or more sensors of the robot.

The one or more sensors of the robot can include at least one of a light detection and ranging (LIDAR) sensor, a camera, a sound detection and ranging (SONAR) sensor, or a radio detection and ranging (RADAR) sensor.

For each of the multiple time steps: the corresponding occupancy map for the time step can include a two-dimensional (2D) grid of occupancy cells, each occupancy cell corresponding to a different portion of the environment of the robot; and the corresponding occupancy map for the time step can indicate, for each occupancy cell in the 2D grid of occupancy cells, whether any obstacle has been identified as occupying the portion of the environment of the robot that corresponds to the occupancy cell.

For each of the multiple time steps, generating the occupancy map for the time step can include analyzing the data representing the environment of the robot at the time step to distinguish between first objects in the environment of the robot that are not capable of interfering with travel of the robot and second objects in the environment of the robot that are capable of interfering with the travel of the robot. Additionally, for each of the multiple time steps and for each second object in the environment of the robot that is identified as being capable of interfering with the travel of the robot, one or more occupancy cells in the 2D grid of occupancy cells of the occupancy map can be designated that corresponds to the portion of the environment where the second object is located as occupied by an obstacle.

Generating the occupancy predictions can include generating a first occupancy prediction for a first future time step that follows the multiple time steps by processing the series of occupancy maps with an obstacle location predictive model to generate the first occupancy prediction. The first occupancy prediction can identify predicted locations of obstacles in the environment of the robot at the first future time step. Generating the occupancy predictions can further include generating additional occupancy predictions for future time steps after the first future time step by iteratively processing with the obstacle location predictive model, for each particular future time step after the first future time step, at least a preceding occupancy map that is based on the occupancy prediction from the time step that precedes the particular future time step to generate an occupancy prediction for the particular future time step.

The obstacle location predictive model can be a deep neural network. The deep neural network can include one or more convolutional layers and one or more recurrent layers.

Determining the planned trajectory for the robot can include: determining, based on the occupancy predictions, respective travel costs of the robot traveling to various locations in the environment of the robot; and generating the planned trajectory by optimizing a function that is based on the respective travel costs of the robot traveling to the various locations in the environment of the robot.

Generating the occupancy predictions can include identifying an obstacle that is represented in at least one occupancy map of the series of occupancy maps, identifying a motion model that corresponds to the identified obstacle that is represented in the at least one occupancy map, and applying the motion model to predict locations of the identified obstacle at the one or more future time steps. The motion model can describe motion characteristics of the identified obstacle or motion characteristics of a class of obstacles that corresponds to the identified obstacle.

The occupancy predictions can be predicted occupancy maps. For each of the one or more future time steps, the method can include generating a predicted occupancy map for the future time step. The predicted occupancy map can include a two-dimensional (2D) grid of occupancy cells, and each occupancy cell can correspond to a different portion of the environment of the robot and indicates a probability that an obstacle will occupy the portion of the environment that corresponds to the occupancy cell at the future time step.

Some implementations of the subject matter described herein include one or more computer-readable media having instructions stored thereon that, when executed by one or more processors, are operable to cause the one or more processors to perform any of the computer-implemented methods described herein. The computer-readable media may be non-transitory, and can be part of a computing system that includes the one or more processors in one or more computers. The computers can be provided in a single physical system, or may be distributed across multiple locations.

Some implementations of the subject matter described in this specification can, in certain instances, realize one or more of the following advantages. A path (also referred to as a "trajectory") for an autonomous robot can be planned that protects against the risk of collisions with obstacles in the environment. Additionally, a navigation system for the robot can identify obstacles in the environment and predict how they will move over an upcoming period of time. The navigation system can then plan a path for the robot that avoids the predicted locations of the moving obstacles. The system predicts locations of obstacles using a model that can be trained based on actual observations of obstacles in various environments, without requiring the training data to be manually labeled. Moreover, the model can be continuously updated during operation of a robot based on comparison of predicted obstacle locations and movements to actual obstacle locations and movements.

The details of one or more embodiments are set forth in the drawings and the detailed description below. Additional features and advantages will be apparent to those of ordinary skill in the field to which the invention pertains.

DESCRIPTION OF DRAWINGS

Like references and numerals in the various drawings indicate like elements.

DETAILED DESCRIPTION

This specification describes systems, methods, devices, and other techniques for planning paths (also referred to herein as 'trajectories') for a self-navigating device, such as an autonomous robot, to travel in an environment. In general, autonomous robots are capable of moving about an environment in which they are located without explicit human control. However, to navigate effectively, the robot must be capable of avoiding collisions with obstacles in its environment. Accordingly, the robot may be equipped with sensors that allow it to detect obstacles and maneuver around them. Some obstacles are static, in that they are fixed in place as the robot moves about the environment. Other obstacles are dynamic, in that they can move about the environment even as the robot travels. The techniques described herein may allow the robot to detect obstacles and travel around them. Moreover, for dynamic obstacles, the robot may predict their trajectories and/or locations at future times, and plan a path for the robot to travel that is unlikely to intersect with either the locations of static obstacles in the environment or the predicted trajectories of the dynamic obstacles.

Figure 1B:
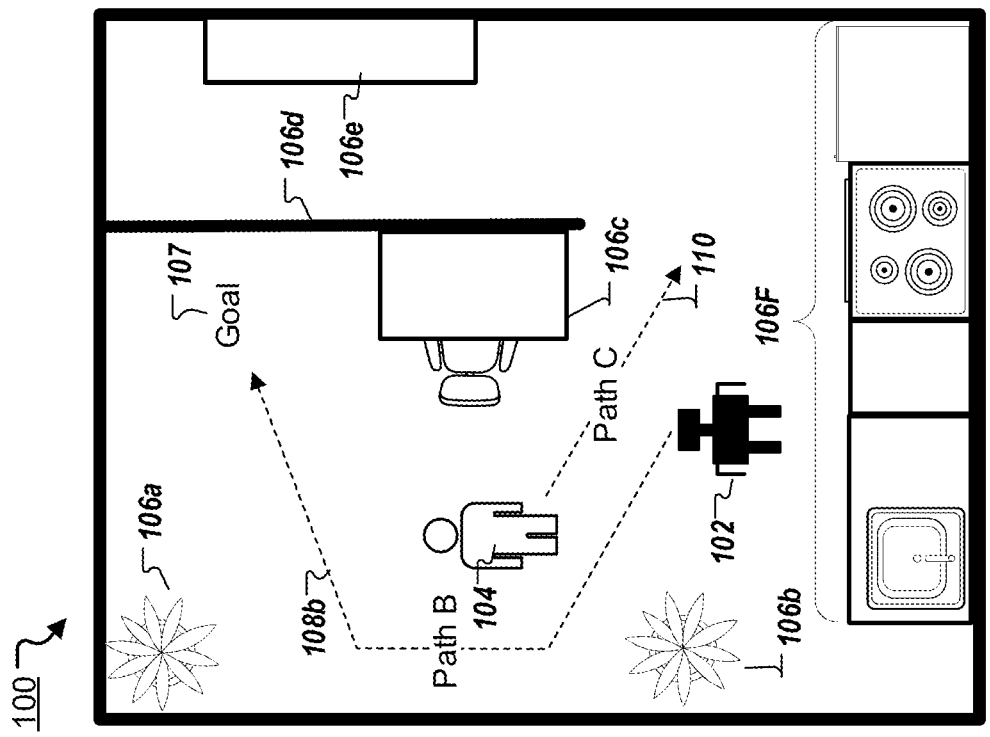
FIG. 1B depicts a conceptual diagram of the environment of FIG. 1A and the predicted path of a dynamic obstacle in the environment.
Figure 1A:
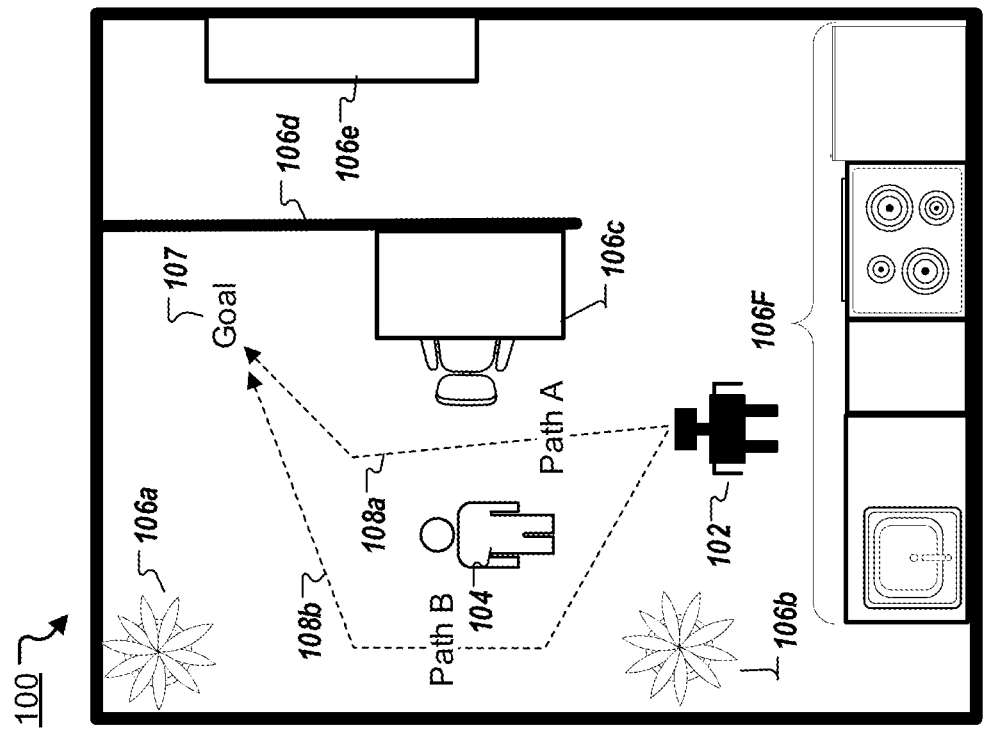
FIG. 1A depicts a conceptual diagram of an example environment of an autonomous robot and two candidate paths for the robot to travel toward a goal in the environment.

Referring to FIG. 1A, a conceptual diagram is depicted of an example environment 100 for an autonomous robot 102. In this example, the environment 100 is the interior of a living space, such as a house or an apartment, where the robot 102 is configured to operate. The robot 102 may move about the environment 102 to carry out various tasks such as floor and surface cleaning, organizing, moving objects, picking up and dropping off objects at specified locations, interacting with occupants or other persons in the house, responding to specific requests from such persons, or a combination of these and/or other tasks. In general, the robot 102 is configured to move about the environment autonomously. Rather than following pre-defined paths or operating under human control, the robot 102 can include various sensors that sense information its environment 100, which can be processed in real-time to locate the robot 102 and to chart a path for the robot 102 through the environment 100 in a safe and accommodating manner. In some implementations, the robot 102 is configured to operate in other types of environments rather than or in addition to a home environment, such as an office, a factory, a ware house, a retail store, an outdoor environment, or a combination of these.

To facilitate navigation through the environment 100, the robot 102 can include a planning engine, or can access a remote planning engine, that determines how the robot 112 should travel toward a goal location 107. Planning the robot's travel can broadly occur in two phases: global planning and local planning. Global planning refers to the process of determining a navigable route from a starting or current location of the robot to the goal location 107, i.e., the destination where the robot 102 is tasked to travel. Local planning, in contrast, involves determining precise maneuvers for the robot to travel along the route set by the global planner. By way of example, a global planner may determine a route through a home environment that would take the robot through a living room and a hallway to reach a goal location in a kitchen. The local planner may then execute on this route by constantly determining short paths or maneuvers that allow the robot to travel along a segment of the route while navigating around obstacles in the immediate vicinity of the robot. For instance, while traveling down a hallway, the robot may detect obstacles that require the robot to veer toward the left or right side of the hallway for avoidance. The local planner may repeatedly plan short paths during travel for an upcoming segment of the route that allow the robot to maneuver around such obstacles and ultimately reach the goal location of the route.

FIGS. 1A and 1B illustrate how the local planner of the robot 102 may determine a path to navigate from its current location to goal location 107 in the presence of static and dynamic obstacles. For instance, the environment 100 includes a number of static obstacles including a pair of plants 106a-b, a desk 106c, a dividing wall 106d, a dresser 106e, and an appliance area 106f. Static obstacles 106a-f persist in the environment 100 and have relatively permanent locations. The static obstacles 106a-f are highly unlikely to move during the robot's travel to goal location 107. The environment 100 can also include any number of dynamic obstacles. A person 104, for instance, is located in the environment 100, and is poised to move while the robot 102 is traveling to goal location 107. The robot 102 may detect static and dynamic obstacles based on measurements taken using sensors physically located on the robot 102, and/or may detect based on pre-defined mapping data indicating the locations of certain obstacles. For instance, the robot 102 may access stored mapping data that describes a blueprint of the home environment 100 and locations of static obstacles with a high degree of permanency such as walls, furniture, plants, and the like. In some implementations, mapping data can be checked against sensing data, or vice versa, to verify either set of data and to ascertain the most reliable indication of obstacles and their locations in the environment.

In FIG. 1A, two possible paths 108a and 108b are shown for the robot 102 to navigate to goal location 107. The first path A (108a) veers to the right of human 104, whereas the second path B (108b) veers to the left of human 104. Both paths 108a and 108b are sufficient to avoid collision of the robot 102 with all obstacles in the environment 100 if all obstacles were assumed to be static. In this scenario, path A (108a) may be preferred to path B (108b) since it provides a shorter, more direct path from the robot's current location to goal location 107. However, because the human 104 is dynamic and moves about the environment 100 at the same time as the robot's planned movements, the local planner may account for the human's motion in determining an optimal trajectory to travel in the environment 100 to goal location 107. FIG. 1B, for example, shows the predicted path C (110) of human 104. The details of predicting a path for a dynamic object such as human 104 are described further with respect to FIGS. 2-5. Because the predicted path C (110) of human 104 would intersect with path A (108a), the robot 102 may instead choose to veer left of the human 104 and initiate travel along path B (108b) to avoid collision with the human 104. The details of determining an optimal path for the robot 102 are described further with respect to FIGS. 2 and 4.

Figure 2:
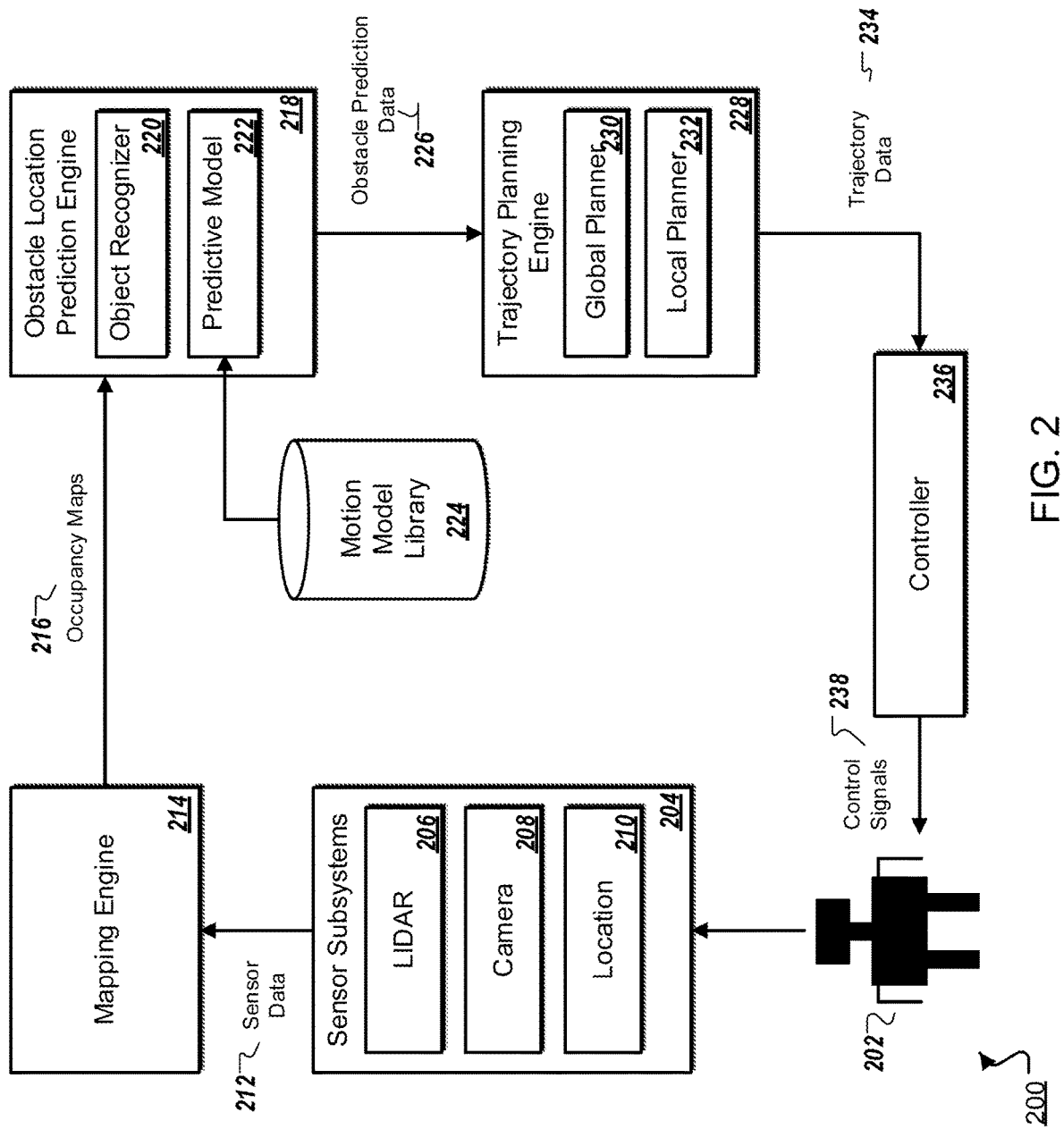
FIG. 2 is a block diagram of a computing system for planning and executing travel of an autonomous robot.

Turning to FIG. 2, a block diagram is depicted of a computing system 200 configured to plan and execute travel of an autonomous robot 202. The system 200 can include one or more computers, which may be distributed in one or more locations. In some implementations, the system 200 is entirely integrated in the robot 202. In other implementations, particular components of the system 200 may be separate from the robot 202, and may be located in either the same environment as the robot 202 or in a remote environment. For example, the robot 202 may access components 214, 218, 224, and/or 228 remotely via the Internet, intranets, or other forms of packet-switched or circuit-switched networks. The system 200 may be configured to carry out operations discussed with respect to FIGS. 1B, and the process 400 described with respect to FIG. 4.

The robot 202 is an autonomous robot that is capable of moving about an environment and performing tasks within the environment. Being autonomous, the robot may respond to human requests and perform actions on behalf of humans, but its navigation is performed substantially independent of human or operator control.

The robot 202 can include one or more sensor subsystems 204. The sensor subsystems 204 allow the robot 202 to collect information about the environment where it is located. This information can be processed and analyzed for various purposes, including to identify objects in the environment and to navigate about the environment. In some implementations, the robot 202 includes a camera system 208. The camera system 208 captures images and/or video of the robot's environment. The camera system 208 can be adapted to capture images and/or video with depth information that indicates distances of objects from the robot in the environment. For example, the camera system 208 may include a stereoscopic camera. In some implementations, the robot 202 includes a LIDAR system 206 that uses light detection and ranging techniques to determine distances of objects from the robot in the environment. In some implementations, the robot 202 includes location sensors 210 such as GPS that allow the robot 202 to ascertain its geographic location and, in some examples, its micro-position within the environment (e.g., a particular location within a residence or office environment). The sensor subsystems 204 generate sensor data 212 characterizing signals captured by all or some of the sensor subsystems 204.

The mapping engine 214 is operable to receive sensor data 212 from the sensor subsystems 204 and to generate a virtual representation of at least a portion of the robot's environment from the sensor data 212.

In some implementations, the mapping engine 214 creates a three-dimensional (3D) representation of the environment based on the sensor data 212. For example, the mapping engine 214 may receive the sensor data 212 that includes measurements from one or more sensors on the robot 202, and may process the measurements to determine where surfaces of obstacles and other objects are located in the environment. The surfaces may be represented using, for example, polygonal meshes, point clouds, point splatting, or any other form of 3D representation. In some implementations, the 3D virtual representation of the environment may represent spaces within the property, instead of surfaces. For example, the virtual representation may include a collection of cells that each represent a particular 3D space or volume of the environment. A suitable resolution for the 3D representation may be selected depending on system requirements. For example, surfaces with more contours may be represented with a higher resolution, e.g., a small polygon size, than surfaces with fewer contours.

In some implementations, the mapping engine 214 is configured to generate a 2D representation of the robot's environment. The 2D representation may be derived from the 3D representation of the environment, or the 2D representation may be generated directly from the sensor data 212 without the intermediate step of creating a 3D representation of the environment. In some implementations, the 2D representation of the environment is an occupancy map. An occupancy map is a map of at least a portion of the environment of the robot 202 that identifies locations of obstacles in the at least the portion of the environment represented by the occupancy map. In some forms, the occupancy map defines a 2D grid of cells, where each cell represents a different portion (e.g., location) of the environment of the robot 202. For each cell, the occupancy map indicates whether an obstacle is located in the corresponding portion of the physical environment represented by the cell. In some implementations, a binary occupancy value (e.g., 1 or 0) is assigned to each cell indicating whether an obstacle is located in the corresponding portion of the physical environment represented by the cell. In other implementations, a floating point occupancy value can be assigned to each cell indicating a probability that an obstacle is located in the corresponding portion of the physical environment represented by the cell. A suitable size and resolution of the occupancy map can be determined based on system requirements. For example, the portion of the environment represented by the occupancy map may extend in one or more directions from the robot 202 (e.g., to the front, back, left, and right of the robot 202) as far as the sensing range of the sensor subsystems 204 permit, or the portion of the environment represented by the occupancy map may extend in one or more directions from the robot 202 by a fixed distance that is less than the full sensing range of the sensor subsystems 204. Generally, the occupancy map represents a portion of the environment 202 that extends at least as far as the local planner 232 may generate a path for the robot 202, which may be a function of the speed of the robot 202 and the frequency with which the local planner 232 updates the path for the robot 202. In some implementations, the occupancy map has relatively fine resolution. For example, each cell in the 2D grid of the occupancy map may represent between a 2×2 millimeter and a 1×1 millimeter region of the physical environment of the robot 202. In some implementations, the occupancy map is a two-dimensional grid having between 100 and 500 rows and columns, and each cell is less than 10×10 mm. In some implementations, the occupancy map has 400 rows, 400 columns, and each cell corresponds to a 0.05 meter×0.05 meter region of the environment, with the robot located at the center of the map.

Figure 3:
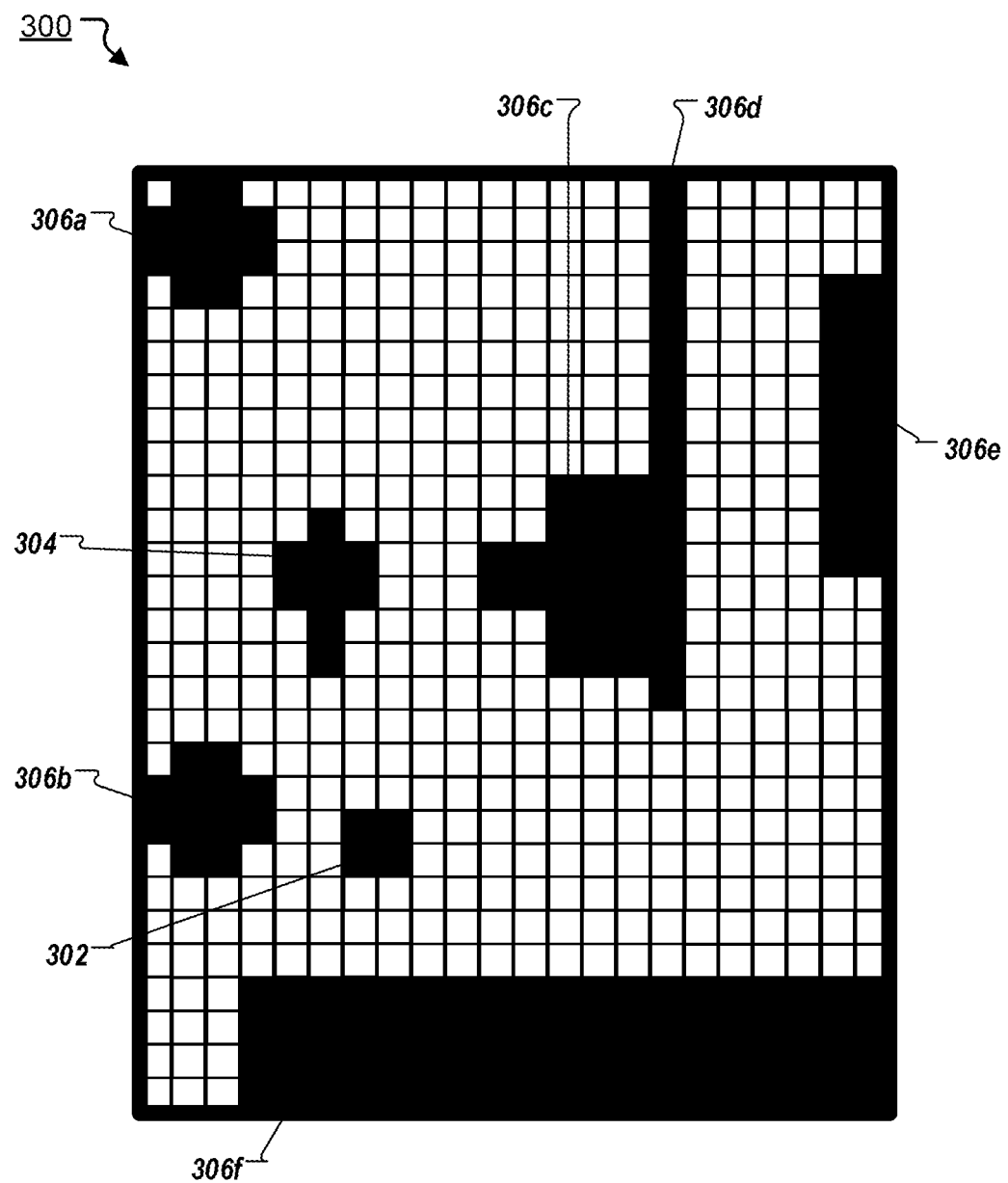
FIG. 3 depicts an example occupancy map representing locations of obstacles in the environment from FIG. 1A.

FIG. 3 depicts an example occupancy map 300 for the environment 100 shown in FIG. 1A. The map 300 includes a two-dimensional grid of cells arranged in a collection of rows and columns. The cells are shaded to represent the binary occupancy value assigned to each cell. In particular, black-shaded cells indicate that the corresponding portion of the environment represented by the cell is occupied by an obstacle. The white-shaded cells indicate that the corresponding portion of the environment represented by the cell is not occupied by an obstacle. Smaller objects may be represented in a single cell, but often larger objects may span multiple cells. For example, cell clusters 306a-f correspond to static objects 106a-f in the environment 100 shown in FIG. 1A. Likewise, cell cluster 304 indicates the location in the environment of dynamic object (human) 104. Notably, the occupancy map 300 may not show all objects located in the environment 100. In some implementations, the occupancy map 300 shows only obstacles that have potential to interfere with the robot's navigation of the environment. Floors, ceilings, light fixtures hanging above the robot, and other objects that pose no collision risk to the robot may be excluded from the occupancy map 300, for example. In some implementations, the mapping engine 314 analyzes the sensor data 212 or an intermediate virtual representation of the environment of the robot to distinguish between obstacles that would interfere with the robot's travel and objects that would not. Potential obstacles to the robot's travel may be represented in the occupancy map 300, while other objects may not be.

Referring again to FIG. 2, the system 200 further includes an obstacle location prediction engine 218. The obstacle location prediction engine 218 processes occupancy maps 216 from mapping engine 214 and outputs obstacle location prediction data 226. Whereas the occupancy maps 216 that are provided as output from mapping engine 214 indicate current or recent locations of obstacles that were observed by the robot 202, the obstacle location prediction data 226 indicates predictions of where the obstacles will be located at one or more future times. Static objects are generally permanent fixtures in the environment and are unlikely to move from their current or recent location to another location in the near future. However, dynamic objects by their nature move around the environment (or are at least capable of moving), and therefore may change locations during the robot's travel. The obstacle location prediction engine 218 processes the occupancy maps 216 and, optionally, additional data such as motion models, to predict how obstacles are likely to move while the robot traverses the environment. Using obstacle location prediction data 226, the planning engine 234 can then account for the movements of dynamic obstacles in generating a planned trajectory for the robot 202.

In some implementations, obstacle location prediction data 226 indicates, for each obstacle represented in an occupancy map 216 at a current or recent time, a probability distribution of the object being located at one or more locations in the environment at one or more future times. For example, the human 104 shown in FIG. 1A may currently be headed toward the refrigerator in the bottom right portion of the environment 100. The obstacle location prediction engine 218 may recognize the human's current or recent trajectory and assign a higher probability of the human 104 being located at a position along path C (110), which heads toward the refrigerator, than a probability of the human 104 suddenly veering toward plant 106b, for example. In some implementations, obstacle location prediction data 226 is in the form of a predicted occupancy map. Like occupancy maps 216 generated by the mapping engine 214, a predicted occupancy map is a two-dimensional representation of the environment of the robot 202 that includes a grid or other collection of occupancy cells corresponding to different locations of the environment, where each cell indicates a predicted probability of an obstacle being located at the corresponding location in the physical environment at a future time. In these implementations, the obstacle location prediction data 226 may or may not include location predictions for specific obstacles, but rather focuses on whether corresponding portions of the environment for each cell will be occupied by any obstacle at the future time.

The obstacle location prediction engine 218 can include one or more sub-components, including object recognizer 220 and predictive model 222. The predictive model 222 is configured to process one or more occupancy maps 216, and optionally one or more motion models from motion model library 224, to generate the obstacle location prediction data 226. The predictive model 222 can be a machine-learning model such as a deep neural network. Neural networks are machine-learning models that employ one or more layers of nonlinear units to predict an output for a received input. Some neural networks include one or more hidden layers in addition to an output layer. The output of each hidden layer is used as input to the next layer in the network, e.g., the next hidden layer or the output layer. Each layer of the network generates an output from a received input in accordance with current values of a respective set of parameters. In some implementations, the predictive model 222 includes one or more convolutional layers followed by one or more recurrent layers. In some implementations, the recurrent layers are followed by transpose convolutional layers mirroring the convolutional layers at the input.

In some implementations, the obstacle location prediction engine 218 receives a series of occupancy maps 216 from the mapping engine 214. Each occupancy map 216 indicates locations of obstacles in the robot's environment at a different one of a series of time steps (e.g., a current time step and one or more preceding time steps). The occupancy maps 216 can be based on observations of the robot's environment at times corresponding to the series of time steps. For example, the robot 202 and sensor subsystems 204 may periodically provide updated sensor data 212 to the mapping engine 214 at each passing time step. The mapping engine 214 may then process each iteration of sensor data 212 to generate an occupancy map 216 for a next time step. The obstacle location prediction engine 218 processes occupancy maps 216 from a set of the most recent time steps (e.g., a predetermined number n of the most recent time steps) to generate obstacle location predictions for one or more future time steps. The obstacle location prediction for each future time step can be, for example, predicted occupancy maps indicating likelihoods of various locations in the robot's environment being occupied by an obstacle at that future time step. For example, the obstacle location prediction data 226 may specify obstacle location prediction maps indicating predicted likelihoods of obstacle locations 50 ms from the current time step, 100 ms from the current time step, 150 ms from the current time step, and so on until a last predicted time step (e.g., 2 seconds from the current time step). The interval between time steps can be, for example, in the range of 5-milliseconds to 5 seconds, and can preferably be in the range 50-500 milliseconds. A suitable interval can be selected based on system requirements for particular implementations. In some implementations, the intervals between occupancy maps 216 for current and past locations of obstacles may be different than the intervals between the future time steps at which predicted obstacle locations are generated. In other implementations, the intervals between past, current, and future time steps is the same.

In some implementations, the predictive model 222 includes recurrent layers that maintain a hidden state that is updated each time a new occupancy map 216 is processed. As such, the obstacle location prediction for a given future time step can be based on not just the single most recent occupancy map 216, but is also partly a function of occupancy maps 216 from one or more preceding time steps. By analyzing occupancy maps 216 across a series of time steps, the predictive model 222 may detect, for example, an object's past speed and direction to help predict the object's future trajectory and location at one or more future time steps by tracking its motion across the environment through the series of occupancy maps 216.

In some implementations, the predictive model 222 may process preceding obstacle location predictions (e.g., predicted occupancy maps from preceding time steps) to generate obstacle location predictions for time steps further in the future. For example, the predictive model may initially process occupancy maps 216 from time steps n−10 through n, where n is the current time or most recent time step, one at a time and in sequence (thereby updating the hidden state of the recurrent portion of the model 222) to generate a predicted occupancy map for future time step n+1. The predicted occupancy map for future time step n+1 may then be provided as input to the predictive model 222 to generate the next predicted occupancy map for future time step n+2. This feedback loop may continue for a pre-defined number of time steps, or until some other terminating condition is met. In some implementations, the predicted occupancy maps from preceding time steps are modified before being fed back as input to the predictive model 222. The modifications can include, for example, converting granular probability distributions that were initially specified by the predicted occupancy maps to binary occupancy predictions that indicate only the most likely future location of each obstacle in the environment. In other implementations, the modifications can include comparing the probability value for each occupancy cell in the prediction to a threshold value and assigning a binary occupancy prediction value to the cell based on whether the probability value meets the threshold. In other implementations, no modifications may be required to provide the output of the predictive model 222 as a preceding time step as input to the model 222 at a next time step. No modifications may be required because the prediction model 222 is capable of processing granular probability distributions from the preceding predicted occupancy map (s), or the model 222 may already be configured to output predicted occupancy map(s) in the same format as occupancy maps 216 (e.g., with only binary occupancy values assigned to each cell indicating whether or not the respective locations in the environment corresponding to cells in the map are predicted to be occupied by an obstacle at a future time step associated with the map).

In some implementations, the predictive model 222 is further configured to use motion models associated with dynamic obstacles in the environment of the robot 202 to generate obstacle location predictions (e.g., predicted occupancy maps for one or more future time steps). The obstacle location predictions can be provided in obstacle location prediction data 226. In general, a motion model is a model that describes motion (e.g., travel characteristics) of a particular obstacle or type of obstacle. The motion models are stored in motion model library 224, which is a data repository provided on storage devices accessible to one or more computers of the system 200. The library 224 may include respective motion models for any number of obstacles that the robot 202 may encounter in an environment. For example, different motion models may be defined for humans, bicycles, automotive vehicles, pets, and the like. In some implementations, the library 224 maintains motion models only for dynamic obstacles that are actually capable of or likely to move about an environment. In other implementations, the library 224 maintain motion models for both static and dynamic obstacles. The motion models for static obstacles, however, may indicate that the obstacles will be stationary as the robot 202 travels in an environment. Motion models for dynamic obstacles may specify travel characteristics for the obstacle, such as expected velocities, accelerations, trajectories, directional changes, or a combination of these and/or other characteristics.

The predictive model 222 may apply a motion model to predict the location of an obstacle at a future time step. For example, if a person riding a bicycle and a person walking are identified adjacent to each other on a sidewalk, the predictive model 222 may predict that the person riding the bicycle will be located ahead of the person walking at a future time step, as a result of the motion model for the bicycle specifying a higher expected velocity than that of the person walking. In some implementations, the motion model for an obstacle specifies a function that predicts a path or motion of the obstacle based on observed values for one or more parameters of the obstacle. For example, the obstacle location prediction engine 218 may provide the motion model with information indicating a current velocity of the obstacle, a recent velocity of the obstacle at one or more preceding time steps, a current location of the obstacle, a recent location of the obstacle at one or more preceding time steps, a current direction that the obstacle is moving or facing/oriented, a recent direction that the obstacle was moving or facing/oriented at one or more preceding time steps, an indication of whether the obstacle is traveling with other obstacles (e.g., whether a person riding a bicycle and a person walking are traveling together and are unlikely to separate, or whether the person riding the bicycle and the person walking are independent), a pose or posture of the obstacle (e.g., whether a person is sitting and unlikely to move or standing and likely to move), an operational status of the obstacle (e.g., whether a device is powered on and capable of moving or powered off and stationary), or a combination of values for all or some of these parameters and/or other parameters.

In some implementations, the system 200 explicitly provides a library of motion models 224 separately from predictive model 222. The motion models 224 and predictive model 222 can then be used together to generate obstacle location predictions. For example, the obstacle location prediction engine 218 may analyze one or more occupancy maps 216 from the mapping engine 214 to identify obstacles in the environment and determine values for any parameters of the obstacles that can be provided as input to the corresponding motion models for the obstacles. The motion models may then output predicted motion data describing how the obstacles are predicted to move in the environment for one or more future time steps. The predictive model 222 may then process the predicted motion data for each obstacle from the motion models, along with data representing one or more occupancy maps, to generate obstacle location predictions such as obstacle location prediction data 226. In implementations where the motion models are explicitly provided outside of the obstacle location prediction model 222, the motion models and predictive model 222 may be trained either jointly or independently of each other. The motion models may be pre-defined based on historical analysis of the movements of different types (e.g., classes) or instances of obstacles. In some cases, the motion models for various obstacles may be automatically learned and refined over time as additional observations of actual movements of the obstacles are obtained and analyzed. To select appropriate motion models form the library 224, the obstacle location prediction engine 218 can include an object recognizer 220 that recognizes obstacles represented in occupancy maps 216, e.g., based on the shape or pattern of clusters of occupied cells in the maps 216 that correspond to obstacles, based on the locations of the obstacles in the environment, or a combination of these and other factors.

In other implementations, the system 200 may not include explicit motion models. Instead, the obstacle location predictive model 222 may be trained to implicitly predict motion/travel characteristics of different types of obstacles in an environment. For example, the predictive model 222 may be trained by processing data representing a sequence of occupancy maps over a series of time steps to predict the locations of obstacles at a future time step. During the training procedure, the predictive model 222 may learn how different types of obstacles represented in the occupancy maps tend to move. In such cases, the predictive model 222 need not rely on an object recognizer 220 to explicitly identify the types or instances of obstacles represented in occupancy maps 216. The predictive model 222 instead directly generates obstacle location predictions from data representing occupancy maps of the robot's environment. Further detail on training the predictive model 222 is discussed with respect to FIG. 5.

Next, the system 200 further includes a planning engine 228. The planning engine 228 includes a global planner 230 and a local planner 232. The global planner 230 is configured to plan a route for an autonomous robot to travel toward a specified goal (target) location. The local planner 232 is configured to plan a short path (trajectory) for the autonomous robot to follow along the planned route. The route for a robot is generally less specific than the path. For instance, while the route may indicate which rooms or regions of an environment the robot should travel through to reach the goal location, the path can indicate precise positions and movements for the robot to take to actually execute the route. The local planner 232, for example, plan maneuvers that ensure the robot avoids collisions with obstacles in the environment. Either planner 230, 232 may use data from one or more sources to generate a route or path. The global planner 230, for instance, may access mapping data representing a map or layout of the robot's environment, as well as semantic data that identifies semantic regions of the environment represented in the map and any constraints that bear on route planning. Based on a starting location, goal location, map, and any applicable semantic data, the global planner can generate a route for the robot. The route may be optimized, for example, to minimize the time or distance for the robot to reach the goal location.

The local planner 232 receives the planned route from global planner 230, along with obstacle prediction data 226 from the obstacle location prediction engine 218, and generates a planned path from the current location of the robot 202 to a farther point along the route. The local planner 232 can constantly update the path as the robot travels, and so it may or may not generate a complete path that terminates at the goal location in a single pass. For example, the local planner 232 may only generate a path for a segment of the route that extends a limited distance or that would guide the robot's travel for a limited amount of time (e.g., the next 1, 2, or 5 seconds). In some implementations, the local planner 232 generates a path by determining particular positions/ locations in the environment for the robot 202 to travel and corresponding times for the robot 202 to advance to those locations. For instance, the planner 232 may determine precise locations where the robot 202 should advance to at each time step in a series of time steps representing fixed time intervals (e.g., 100, 200, or 500 milliseconds) for the robot's impending travel.

The local planner 232 can generate a path for the robot along a segment of the route by optimizing a path cost function that minimizes a cost of the robot traveling with respect to obstacles in the robot's environment. For example, if a path for the robot's travel is to be planned over an upcoming three-second period of time, the planner 232 the may analyze obstacle prediction data 226 from the obstacle location prediction engine 218 to identify likelihoods of obstacles being located at various locations of the environment during the upcoming three-second period of time. The various locations of the environment (e.g., each location corresponding to a cell in a predicted occupancy map) may be assigned travel cost values at each of a series of time steps over the upcoming three-second period of time. The travel cost value of a given location and time step in the environment indicates a cost of the robot 202 traveling to that location at that time step. Locations that are occupied by static obstacles such as walls or plants may have high travel cost values over the entire three-second period of time. However, locations where dynamic obstacles are predicted to pass through temporarily may have high travel cost values at times when the obstacles are located at those locations, but may have low travel cost values at times when the obstacles are not located there. Additionally, in some implementations, the local planner 232 may assign higher cost values to areas of the environment surrounding obstacles, thereby providing a "buffer zone" around the obstacles that the robot 202 should not cross. The local planner 232 may then generate a travel path for the robot 202 that minimizes an overall travel cost of the path. By minimizing travel cost, the robot 202 is caused to avoid collisions with obstacles or violating the buffer zones around obstacles, for both static obstacles that have a fixed location and dynamic obstacles that move about the environment at the same time as the robot 202.

The planning engine 228 provides trajectory data 234 as output to a controller 236 of the robot 202. The trajectory data 234 represents the planned path or trajectory for the robot 202. For instance, the trajectory data 234 can include a vector of coordinates representing a series of locations along the path that the robot should advance to at discrete times. The controller 236 is operable to generate control signals 238 to one or more mechanical actuators in the robot 202, thereby causing the robot 202 to move along the planned path. In some implementations, even before the robot 202 has traveled along the entire length of a planned path (e.g., corresponding to a segment of the route), the system 200 may re-analyze the environment and update the planned path on a frequent basis to ensure the robot continues to travel on an optimized trajectory even as conditions in the environment may change over time during the course of the robot's travel.

Figure 4:
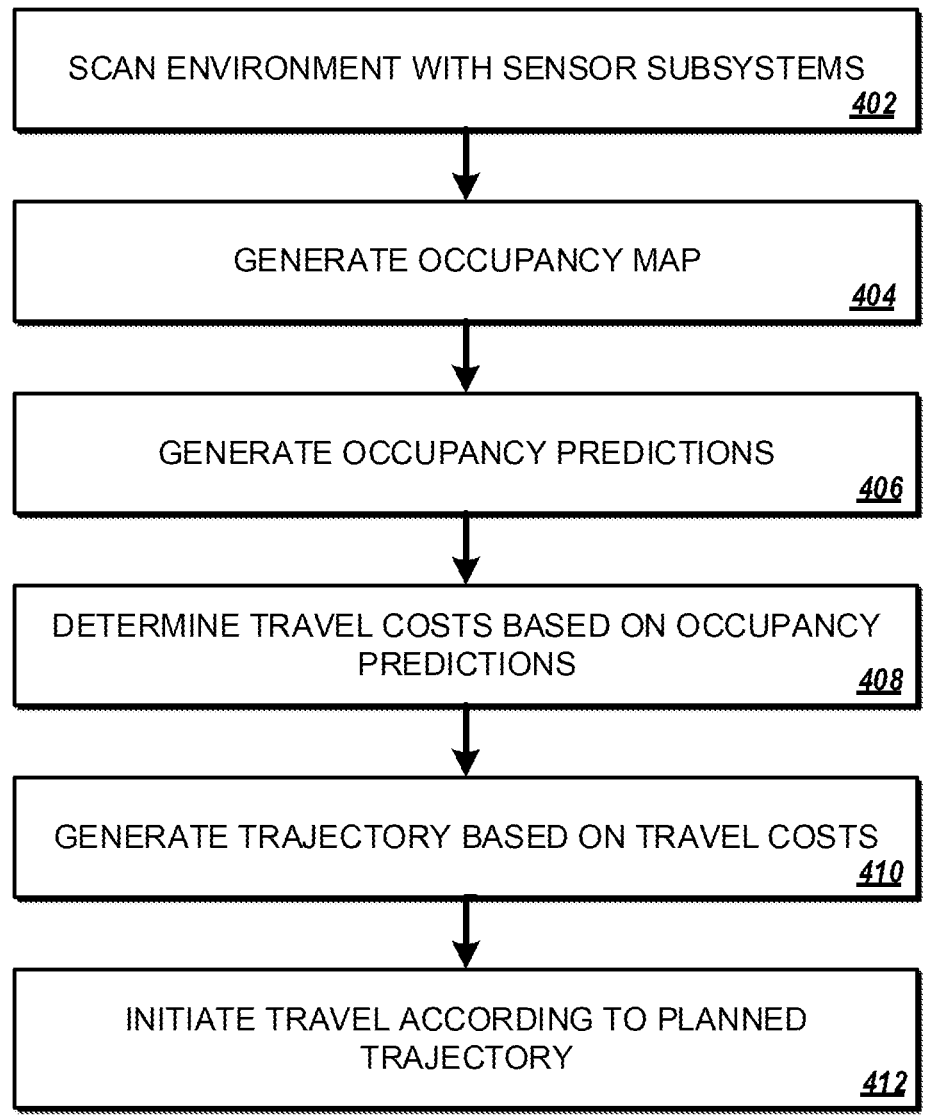
FIG. 4 is a flowchart of an example process for determining a path for an autonomous robot to travel in an environment.

FIG. 4 is a flowchart of an example process 400 for determining a path for an autonomous robot to travel in an environment. In some implementations, the process 400 can be carried out by a system of one or more computers, such as system 200 including robot 202.

At stage 402, the robot uses one or more sensor subsystems to scan the environment and generate sensor data that describes measurements by the one or more sensor subsystems. The sensor subsystems can include LIDAR sensors, RADAR sensors, SONAR sensors, image sensors (e.g., of a stereoscopic camera), location sensors, or a combination of these and/or other sensors. For example, when the robot enters a room or other space in its environment, the robot may scan the room to collect information that can be processed to identify where obstacles are located in the room. In some implementations, the re-scans the environment and generates updated sensor data at regular time intervals. That is, at each time step in a series of time steps, the robot can scan its environment and generate an updated instance of sensor data for the time step.

At stage 404, the system generates occupancy maps based on the sensor data obtained at stage 402. In some implementations, the system includes a mapping engine for generating occupancy maps. In particular, for each time step in the series of time steps where the robot provided an updated instance of sensor data, the mapping engine determines an occupancy map for the time step that indicates the current locations of obstacles in the environment at that time step. The occupancy map can include a grid of occupancy cells that each correspond to a small area/location of the environment of the robot, and the grid can span a region of the environment proximate to the robot that is covered by the sensor data. Each occupancy cell can have one of two states as indicated by an occupancy value for the cell: occupied or not-occupied. If the cell is occupied, this signifies that the sensor data indicates the corresponding location of the environment is occupied by an obstacle. If the cell is not-occupied, this signifies that the sensor data indicates the corresponding location of the environment is not occupied by an obstacle. In some instances, occupancy cells representing the same location in an environment may have different states at different time steps. This can occur, for example, if a dynamic obstacle moves through a location of the environment and is present at that location at a first time step but not present at that location at another time step.

At stage 406, the system determines occupancy predictions for one or more future time steps. In some implementations, an obstacle location prediction engine provides a sequence of occupancy maps for a series of time steps to a predictive model. The predictive model processes the sequence of occupancy maps one at a time and then outputs an occupancy prediction for a future time step. The occupancy prediction can be, for example, in the form of a predicted occupancy map that includes a grid of occupancy cells and that indicates, for each occupancy cell, a likelihood (e.g., a probability) that the location of the environment corresponding to the occupancy cell will be occupied by an obstacle at the future time step. In some implementations, for time steps after a first future time step, predicted occupancy map from a preceding time step can be fed back to the predictive model as an input to generate a new predicted occupancy map for the next future time step. For example, a series of occupancy maps up to a current time step based on sensor data can be processed to generate a first predicted occupancy map for a first future time step. An input based on the first predicted occupancy map can then be processed by the predictive model to generate a second predicted occupancy map for a second future time step. These operations can repeat until predicted occupancy maps are generated for a pre-defined number of future time steps.

At stage 408, the system determines travel costs based on the occupancy predictions. In some implementations, for each future time step, a local planning engine determines travel costs for the future time step by generating a travel cost map. The travel cost map can include a grid of cells like the grid of cells contained in the occupancy map for the future time step. Each cell in the travel cost map corresponds to a different area/location of the environment of the robot. The local planning engine can assign a travel cost value to each cell in the travel cost map based at least in part on the likelihood that the area/location of the environment corresponding to the cell or a nearby cell will be occupied by an obstacle at the future time step, as indicated by the predicted occupancy map for the future time step. If there is no possibility, or an insignificant possibility, of the area/location of an environment corresponding to a cell being occupied, the cell may be assigned a low travel cost value. If there is a high probability of the area/location of an environment corresponding to a cell being occupied, the cell may be assigned a high travel cost value. In some implementations, a higher travel cost may be assigned to cells that are more likely to be occupied than to cells than are less likely to be occupied by obstacles in the environment. In some implementations, a higher travel cost may be assigned to cells that are adjacent to or otherwise nearby cells (e.g., within a threshold number of cells) that are likely to be occupied by an obstacle at the time step, so as to provide a "buffer" zone around obstacles that the robot should not travel in.

At stage 410, the local planning engine generates a trajectory for the robot based on the travel costs for the future time steps. In some implementations, the local planning engine solves an optimization function to determine a path that minimizes the cost of traveling through the environment toward a goal location of a route for the robot. In this way, the path is incented to traverse areas/locations of the environment corresponding to cells having lower travel cost values where obstacles are unlikely to be located, while avoiding areas/locations of the environment corresponding to cells having higher travel cost values where obstacles are more likely to be located or that are nearby predicted locations of obstacles. As a result, the robot can avoid collisions with obstacles in the environment and can comply with policies that respect social considerations, such as providing adequate space when traveling around humans, pets, or precious objects. At stage 412, the robot then initiates travel and follows the planned path/trajectory. In some instances, a new planned path/trajectory may be generated before the robot completes travel along the current planned path/trajectory and the robot may then shift to traveling along the new path/trajectory before completion of the preceding path/trajectory.

Figure 5:
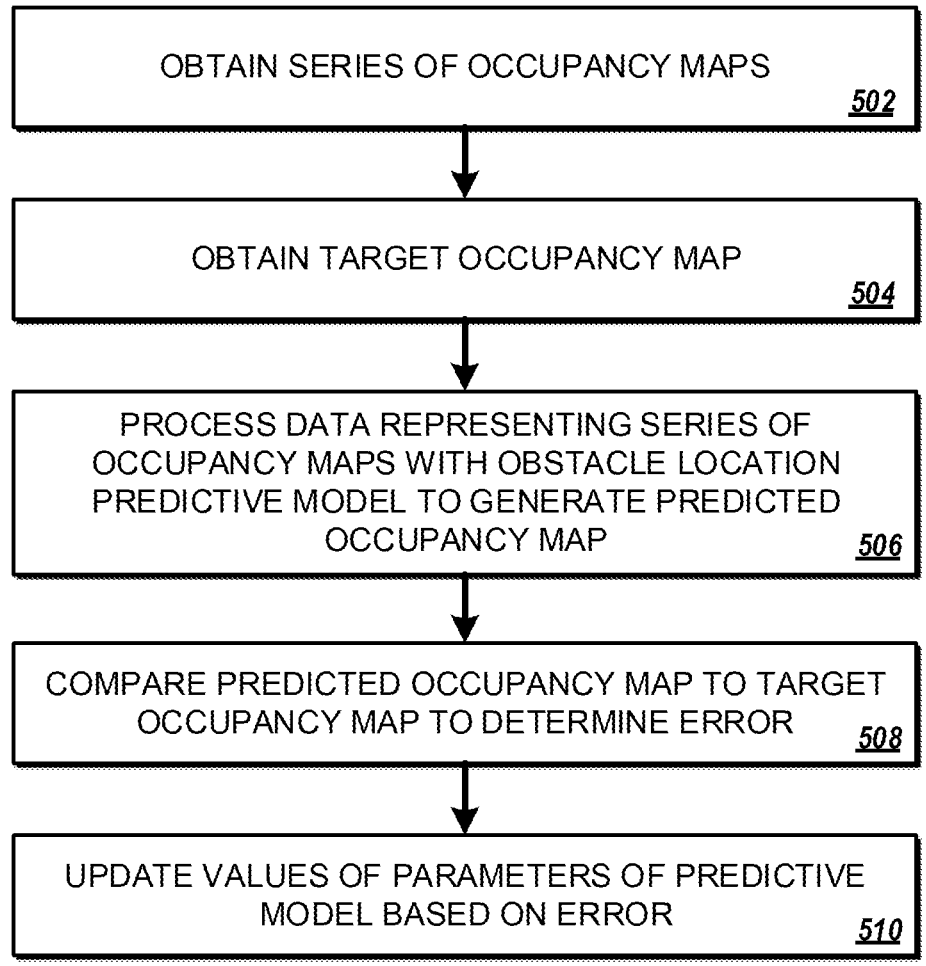
FIG. 5 is a flowchart of an example process for training an obstacle location predictive model.

FIG. 5 is a flowchart of an example process 500 for training an obstacle location predictive model, e.g., predictive model 222. The process 500 can employ machine-learning techniques to iteratively update values of internal parameters of the model such as weights of nonlinear units in a deep neural network. Stages 502-510 represent one training iteration, but these stages may be repeated for different sets of training data in additional iterations until a training termination condition occurs. At stage 502, a training system obtains a series of training occupancy maps representing locations of obstacles in an environment at each time step in a series of time steps. Some obstacles may be static and are unchanged in the series of occupancy maps. Other obstacles may be dynamic and may move to different locations across the series of occupancy maps. At stage 504, the system obtains a target occupancy map. The target occupancy map represents locations of obstacles in the environment at a future time step following the time steps of the training occupancy maps that were obtained at stage 502. For example, the training series of occupancy maps may be obtained for time steps n-m through n. The target occupancy map can then represent locations of obstacles at time step n+j. In some implementations, j=1, but other values are also possible for time steps further in the future.

At stage 506, the system provides the training series of occupancy maps to the predictive model for processing. In general, the predictive model is tasked with predicting generating a predicted occupancy map (or other form of occupancy prediction) for time step n+j based on the series of occupancy maps from time steps n-m through n. The predictive model may have one or more recurrent layers that effectively provide a memory in the form of a hidden state that is updated as each of the series of occupancy maps is processed in sequence. The predictive model outputs data representing a predicted occupancy map as a result of processing the series of occupancy maps. At stage 508, the training system compares the predicted occupancy map to the target occupancy map. The difference between the predicted and target occupancy maps represents an error in the prediction. At stage 510, the system updates the values of the internal parameters of the predictive model based on the error. In some implementations, the values of the model's parameters are updated using machine-learning techniques such as backpropagation with gradient descent.

Figure 6:
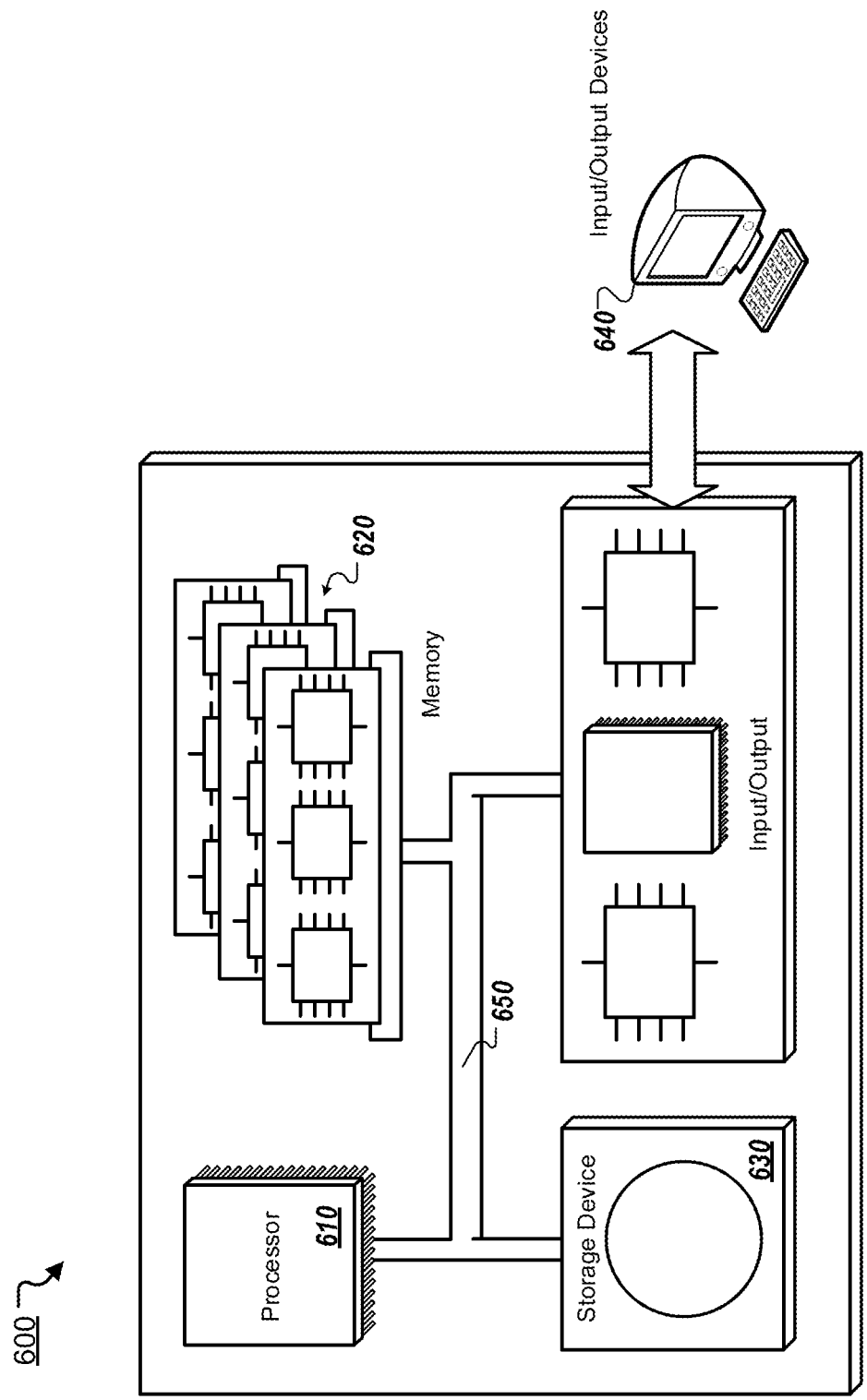
FIG. 6 is a schematic diagram of a computing device that can carry out the operations described for the computer-implemented methods and other techniques described in this specification.

FIG. 6 is a schematic diagram of a computing device 600. The device 600 can be used to carry out the operations described in association with any of the computer-implemented methods and other techniques described previously, according to an example implementation. The device 600 is intended to include various forms of digital computers, such as laptops, desktops, workstations, personal digital assistants, servers, blade servers, mainframes, and other appropriate computers. The device 600 can also include mobile devices, such as personal digital assistants, cellular telephones, smartphones, and other similar computing devices. Additionally the system can include portable storage media, such as, Universal Serial Bus (USB) flash drives. For example, the USB flash drives can store operating systems and other applications. The USB flash drives can include input/output components, such as a wireless transmitter or USB connector that can be inserted into a USB port of another computing device.

The device 600 includes a processor 610, a memory 620, a storage device 630, and an input/output device 640. Each of the components 610, 620, 630, and 640 are interconnected using a system bus 650. The processor 610 is capable of processing instructions for execution within the device 600. The processor can be designed using any of a number of architectures. For example, the processor 610 can be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the device 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can be a floppy disk device, a hard disk device, an optical disk device, or a tape device.

The input/output device 640 provides input/output operations for the system 400. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As used throughout this specification, the terms optimum, optimize, and variations thereof refer to improving performance of a system through the use of the techniques discussed herein, and does not imply that the performance obtained is necessarily the most optimum performance that is achievable.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method, comprising:
obtaining, for each of a plurality of time steps, data representing an environment of a robot at the time step;
generating a series of occupancy maps that each identify locations of one or more obstacles in the environment of the robot at a different one of the plurality of time steps,
wherein generating the occupancy map for a particular time step of the plurality of time steps comprises selectively adding to the occupancy map representations of obstacles that are classified as capable of interfering with travel of the robot, wherein the occupancy map generated for the particular time step includes a representation of a first obstacle that moves about the environment and is classified as capable of interfering with travel of the robot;

generating, using the series of occupancy maps, occupancy predictions for one or more future time steps that follow the plurality of time steps, each occupancy prediction identifying predicted locations of one or more obstacles in the environment of the robot at a different one of the future time steps, wherein the one or more obstacles for which occupancy predictions are generated includes the first obstacle;

determining a planned trajectory for the robot using the occupancy predictions;

and initiating travel of the robot along the planned trajectory.

2. The computer-implemented method of claim 1, wherein the data representing the environment of the robot at the particular time step is a three-dimensional (3D) representation of the environment based on measurements by one or more sensors of the robot.

3. The computer-implemented method of claim 2, wherein the one or more sensors of the robot comprise at least one of a light detection and ranging (LIDAR) sensor, a camera, a sound detection and ranging (SONAR) sensor, or a radio detection and ranging (RADAR) sensor.

4. The computer-implemented method of claim 1, wherein:
the occupancy map for the particular time step comprises a two-dimensional (2D) grid of occupancy cells, each occupancy cell corresponding to a different portion of the environment of the robot; and
the occupancy map for the particular time step indicates, for each occupancy cell in the 2D grid of occupancy cells, whether an obstacle classified as capable of interfering with travel of the robot has been identified as occupying the portion of the environment of the robot that corresponds to the occupancy cell.

5. The computer-implemented method of claim 1, wherein the occupancy map includes a grid of cells corresponding to respective locations in the environment of the robot, wherein a larger obstacle is represented in the occupancy map by setting a cluster of cells in the occupancy map to an occupied status, wherein a smaller obstacle is represented in the occupancy map by setting a single cell in the occupancy map to the occupied status.

6. The computer-implemented method of claim 1, wherein generating the occupancy predictions comprises generating a first occupancy prediction for a first future time step that follows the plurality of time steps by processing the series of occupancy maps with an obstacle location predictive model to generate the first occupancy prediction, the first occupancy prediction identifying predicted locations of obstacles in the environment of the robot at the first future time step.

7. The computer-implemented method of claim 6, wherein generating the occupancy predictions further comprises generating additional occupancy predictions for future time steps after the first future time step by iteratively processing with the obstacle location predictive model, for each particular future time step after the first future time step, at least a preceding occupancy map that is based on the occupancy prediction from the time step that precedes the particular future time step to generate an occupancy prediction for the particular future time step.

8. The computer-implemented method of claim 6, wherein the obstacle location predictive model is a deep neural network.

9. The computer-implemented method of claim 8, wherein the deep neural network includes one or more convolutional layers and one or more recurrent layers.

10. The computer-implemented method of claim 1, wherein determining the planned trajectory for the robot comprises;
determining, based on the occupancy predictions, respective travel costs of the robot traveling to various locations in the environment of the robot; and
generating the planned trajectory by optimizing a function that is based on the respective travel costs of the robot traveling to the various locations in the environment of the robot.

11. The computer-implemented method of claim 1, wherein generating the occupancy predictions comprises:
identifying an obstacle that is represented in at least one occupancy map of the series of occupancy maps;
identifying a motion model that corresponds to the identified obstacle that is represented in the at least one occupancy map, wherein the motion model describes motion characteristics of the identified obstacle or motion characteristics of a class of obstacles that corresponds to the identified obstacle; and
applying the motion model to predict locations of the identified obstacle at the one or more future time steps.

12. The computer-implemented method of claim 1, wherein the occupancy predictions are predicted occupancy maps, and for a first future time step of the one or more future time steps:
the method comprises generating a predicted occupancy map for the first future time step, the predicted occupancy map comprising a two-dimensional (2D) grid of occupancy cells, each occupancy cell corresponding to a different portion of the environment of the robot and indicating a probability that any obstacle will occupy the portion of the environment that corresponds to the occupancy cell at the first future time step.

13. One or more non-transitory computer-readable media having instructions stored thereon that, when executed by one or more processors, cause the one or more processors to perform operations comprising:
obtaining, for each of a plurality of time steps, data representing an environment of a robot at the time step;
generating a series of occupancy maps that each identify locations of one or more obstacles in the environment of the robot at a different one of the plurality of time steps,
wherein generating the occupancy map for a particular time step of the plurality of time steps comprises selectively adding to the occupancy map representations of obstacles that are classified as capable of interfering with travel of the robot,
wherein the occupancy map generated for the particular time step includes a representation of a first obstacle that moves about the environment and is classified as capable of interfering with travel of the robot;
generating, using the series of occupancy maps, occupancy predictions for one or more future time steps that follow the plurality of time steps, each occupancy prediction identifying predicted locations of one or more obstacles in the environment of the robot at a different one of the future time steps, wherein the one or more obstacles for which occupancy predictions are generated includes the first obstacle;

determining a planned trajectory for the robot using the occupancy predictions; and initiating travel of the robot along the planned trajectory.

14. The computer-readable media of claim 13, wherein the data representing the environment of the robot at the particular time step is a three-dimensional (3D) representation of the environment based on measurements by one or more sensors of the robot.

15. The computer-readable media of claim 14, wherein the one or more sensors of the robot comprise at least one of a light detection and ranging (LIDAR) sensor, a camera, a sound detection and ranging (SONAR) sensor, or a radio detection and ranging (RADAR) sensor.

16. The computer-readable media of claim 13, wherein:
the occupancy map for the particular time step comprises a two-dimensional (2D) grid of occupancy cells, each occupancy cell corresponding to a different portion of the environment of the robot; and
the occupancy map for the particular time step indicates, for each occupancy cell in the 2D grid of occupancy cells, whether an obstacle classified as capable of interfering with travel of the robot has been identified as occupying the portion of the environment of the robot that corresponds to the occupancy cell.

17. The computer-readable media of claim 13, wherein generating the occupancy predictions comprises generating a first occupancy prediction for a first future time step that follows the plurality of time steps by processing the series of occupancy maps with an obstacle location predictive model to generate the first occupancy prediction, the first occupancy prediction identifying predicted locations of obstacles in the environment of the robot at the first future time step.

18. The computer-readable media of claim 17, wherein generating the occupancy predictions further comprises generating additional occupancy predictions for future time steps after the first future time step by iteratively processing with the obstacle location predictive model, for each particular future time step after the first future time step, at least a preceding occupancy map that is based on the occupancy prediction from the time step that precedes the particular future time step to generate an occupancy prediction for the particular future time step.

19. A system, comprising:
one or more processors; and
one or more computer-readable media having instructions stored thereon that, when executed by the one or more processors, cause the one or more processors to perform operations comprising;
obtaining, for each of a plurality of time steps, data representing an environment of a robot at the time step;
generating a series of occupancy maps that each identify locations of one or more obstacles in the environment of the robot at a different one of the plurality of time steps,
wherein generating the occupancy map for a particular time step of the plurality of time steps comprises selectively adding to the occupancy map representations of obstacles that are classified as capable of interfering with travel of the robot,
wherein the occupancy map generated for the particular time step includes a representation of a first obstacle that moves about the environment and is classified as capable of interfering with travel of the robot;
generating, using the series of occupancy maps, occupancy predictions for one or more future time steps that follow the plurality of time steps, each occupancy prediction identifying predicted locations of one or more obstacles in the environment of the robot at a different one of the future time steps, wherein the one or more obstacles for which occupancy predictions are generated includes the first obstacle;
determining a planned trajectory for the robot using the occupancy predictions; and
initiating travel of the robot along the planned trajectory.

* * * * *